H. NOERDLINGER, A. CAROSELLI & L. BERG.
PROCESS OF PREPARING PURE LACTIC ACID.
APPLICATION FILED NOV. 25, 1907.
924,494.
Patented June 8, 1909.
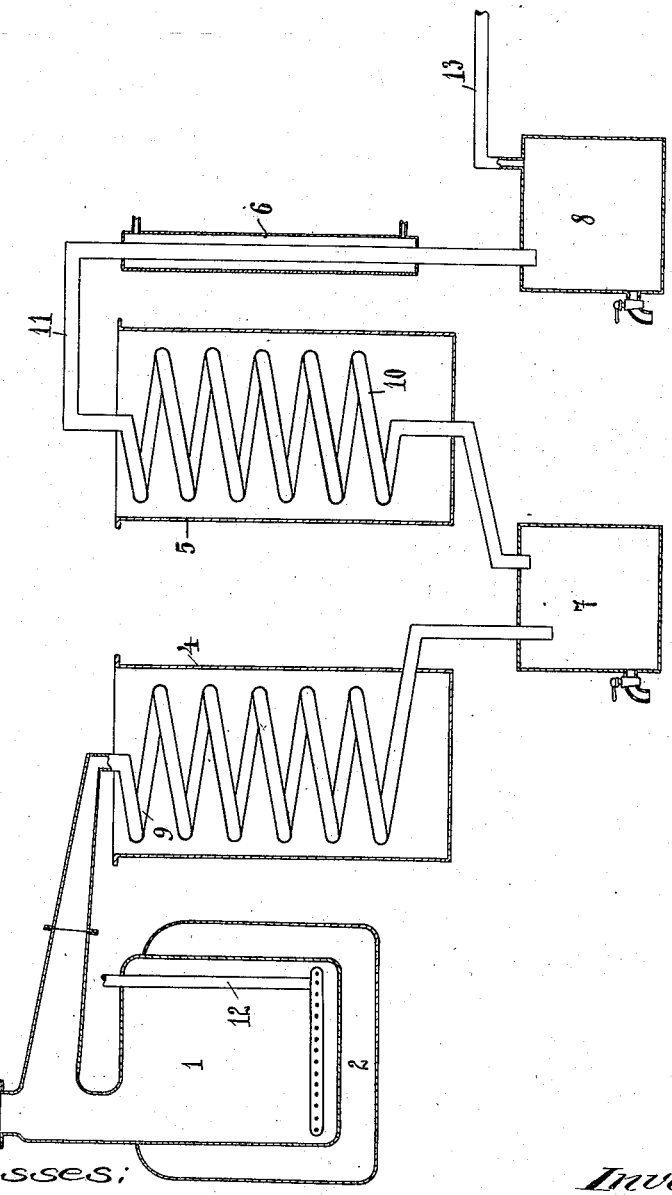

UNITED STATES PATENT OFFICE.

HUGO NOERDLINGER, ARNALDO CAROSELLI, AND LUDWIG BERG, OF FLÖRSHEIM-ON-THE-MAIN, GERMANY, ASSIGNORS TO THE FIRM OF CHEMISCHE FABRIK FLORSHEIM, DR. H. NOERDLINGER, OF FLÖRSHEIM-ON-THE-MAIN, GERMANY.

PROCESS OF PREPARING PURE LACTIC ACID.

No. 924,494.   Specification of Letters Patent.   Patented June 8, 1909.

Application filed November 25, 1907. Serial No. 403,735.

*To all whom it may concern:*

Be it known that we, HUGO NOERDLINGER, doctor of philosophy, a subject of the King of Würtemberg, ARNALDO CAROSELLI, doctor of philosophy, a subject of the King of Prussia, and LUDWIG BERG, doctor of philosophy, a subject of the Grand Duke of Baden, residing at Flörsheim-on-the-Main, Germany, have invented certain new and useful Improvements in Processes of Preparing Pure Lactic Acid from Crude Lactic Acids, of which the following is a specification.

A great variety of means have already been proposed for purifying and concentrating crude or impure lactic acid, generally sold in a 50 per cent. solution, in such a way as to enable it to successfully compete with the chemically pure lactic acid which is prepared by other methods. Waite (Germ. Pat. 140,319) treats the crude aqueous solution of lactic acid with amyl alcohol, mixes the obtained alcoholic solution with water and distils with steam. Blumenthal and Chain (Germ. Pat. 169,992) mix the commercial lactic acid with anilin or its homologues, recrystallize the precipitate and decompose it by means of steam, the latter carrying away the anilin. It is sometimes necessary to concentrate the obtained lactic acid in a vacuum. Finally Hillringhaus and Heilmann (Germ. Pat. 171,835) try to avoid the losses connected with the distilling process by converting lactic acid into its esters; these are then decomposed again and the alcohol removed. In this case, too, the product has to be concentrated in a vacuum. Now we have found a new process which renders it possible to obtain pure lactic acid direct from commercial crude products or solutions, such as result from fermenting processes and which generally contain numerous impurities, by one single distillation without any chemical process nor a vacuum evaporation, with the result that the lactic acid thus obtained is pure enough to be employed for pharmaceutical use and for food purposes. This is accomplished by distilling lactic acid in a strong current of gas which yields a pure concentrated product, almost free from anhydrid, all impurities remaining behind.

In carrying out this process we have found, that lactic acid distils at a much lower temperature than if no current of gas is employed. Out of a technical lactic acid of 57.6%, which showed a brown color, had an unpleasant caramel-like smell and which contained considerable quantities of sulfuric acid and sugar, the water distilled off between 40° and 80°. The temperature then rose to 120–130° and pure lactic acid, a clear colorless syrup, distilled over, the gas-current continuing all the time. Titration proved that the product was of a purity of 100%. Exposed to a temperature at least as low as −10° for some time, this acid turns into a crystalline body which melts at +18°. The temperature at which the pure lactic acid distils over, varies with the speed of the gas-current employed. The stronger the current of gas, the lower the distilling temperature. Air or any other gas may be employed, provided that it does not chemically act upon the acid.

The present process differs from that of distilling lactic acid with steam, as the latter increases the amount of water in the acid; this not being the case with a gas-current. Therefore no further concentrating of the acid is required, and the product is free from lactide as it cannot be obtained when concentrated by evaporation.

In concentrating crude lactic acid as well as in distilling concentrated lactic acid, the current of gas must be passed, finely distributed, through the lactic acid. A current of gas passed over the lactic acid does not produce the desired result. As regards pressure and rate of passage of the gas current it is pointed out that it is of no consequence whether there is an over-pressure, ordinary atmospheric pressure or a vacuum on the lactic acid in the vessel where it is concentrated or distilled, but it is important that the current of gas should be passed through the lactic acid at a certain speed. This speed depends on the difference between the pressure of the gas before entering into the lactic acid and the pressure above the acid in the still, which difference must be one-half atmosphere. Thus, if for example there is ordinary pressure on the lactic acid in the still, the gas used in the process should have an over-pressure of one-half atmosphere; or, if there is an over-pressure of one atmosphere in the still, the gas should enter with an over-pressure of one and one-half atmospheres. In sucking the current of gas through the liquid a relative vacuum of about 380 mm. should therefore be caused over the lactic acid in order to impart the necessary speed to the gas. For producing the current of gas and for maintaining circulation, the gas may either be blown through the lactic acid by means of a compressor arranged before the still with or without a reservoir, or it may be sucked through by a vacuum-pump arranged behind the apparatus. The gas is first passed through the crude lactic acid at a temperature of 40–50° C. and the temperature is then raised as the percentage of water decreases, until at 120–130°, when all water is driven off, the concentrated lactic acid distils over. This acid is then condensed in condensers cooled by cold water. Thus the temperature of the condensers is generally the same as that of the room.

Referring to the accompanying drawing showing a diagrammatic view of one form of apparatus for carrying out the process, the still 1 is half filled with 50% crude lactic acid; the lactic acid is then heated to about 40–50° C. by letting steam into the steam-jacket 2, or, in the absence of a steam-jacket, over an open fire; the current of gas is then blown into the lactic acid, by means of a compressor, through the pipe 12 formed into a helix at the bottom of the still and provided with fine openings. At the beginning the lid 3 may be opened so as to let the water from the crude lactic acid escape without hindrance. When no more water escapes, the temperature is slowly raised until pungent vapors rise from the opening. The lid 3 is then closed and the temperature, which has by now risen above 100° C., is raised to 120–130° C. and maintained there. The current of gas laden with vapors of lactic acid has to enter the condenser 4, the greater part of the lactic acid vapors thus being condensed in the helix 9 and flowing into the receiver 7 in the form of thick concentrated acid. The current of gas, still carrying with it vapors of lactic acid, now enters the reflux-condenser 5 and gives off further lactic acid by way of condensation. This lactic acid also flows into the receiver 7. From the condenser 5 the gas enters the pipe 11 surrounded by a casing 6 filled with cold water in order to deprive the current of gas of any lactic-acid vapors that may not have been condensed in the condenser 5. In the receiver 8 through which the current of gas now passes, this acid is collected, while the current of gas may escape through the pipe 13. However, the lid 3 may also be kept closed from the beginning so that the steam is condensed in the condensers 4 and 5 and the water thus formed collects in the receivers 7 and 8. The lactic acid distilling afterward becomes diluted by this water.

What we claim and desire to secure by Letters Patent of the United States, is:—

1. Process of preparing pure lactic acid from crude concentrated lactic acids, consisting in distilling off the pure lactic acids by a current of gas, not liquefiable at ordinary temperature and inert against lactic acid, and in separately collecting the distilled pure lactic acid.

2. Process of preparing pure lactic acid from crude concentrated lactic acids, consisting in heating and distilling off the pure lactic acids by a current of a heated gas, not liquefiable at ordinary temperature and inert against lactic acid, and in separately collecting the distilled pure lactic acid.

3. Process of preparing pure lactic acid from crude lactic acids, consisting in passing a gas not liquefiable at ordinary temperature and inert against lactic acid, through heated crude lactic acid, whereby water is first removed, then heating to a higher temperature while the current of such gas is continued and separately collecting the purified lactic acid removed thereby.

4. Process of preparing pure lactic acid from crude lactic acids, consisting in passing a heated gas not liquefiable at ordinary temperature and inert against lactic acid, through heated crude lactic acid, whereby water is first removed, then heating to a higher temperature while the current of such gas is continued and separately collecting the purified lactic acid removed thereby.

In testimony whereof we have hereunto set our hands in presence of two subscribing witnesses.

HUGO NOERDLINGER.
ARNALDO CAROSELLI.
LUDWIG BERG.

Witnesses:
  JEAN GRUND,
  CARL GRUND.